United States Patent
Ouyang et al.

(10) Patent No.: US 12,013,809 B2
(45) Date of Patent: Jun. 18, 2024

(54) COMPUTING ARRAY AND PROCESSOR HAVING THE SAME

(71) Applicant: Beijing Tsingmicro Intelligent Technology Co., Ltd., Beijing (CN)

(72) Inventors: Peng Ouyang, Beijing (CN); Yaxue Zhang, Beijing (CN)

(73) Assignee: BEIJING TSINGMICRO INTELLIGENT TECHNOLOGY CO., LTD., Beijing (CN)

(*) Notice: Subject to any disclaimer, the term of this patent is extended or adjusted under 35 U.S.C. 154(b) by 97 days.

(21) Appl. No.: 17/483,395

(22) Filed: Sep. 23, 2021

(65) Prior Publication Data
US 2022/0100699 A1    Mar. 31, 2022

Related U.S. Application Data

(63) Continuation of application No. PCT/CN2021/092517, filed on May 8, 2021.

(30) Foreign Application Priority Data

Sep. 30, 2020 (CN) ......................... 202011066367.5

(51) Int. Cl.
   *G06F 15/80* (2006.01)
   *G06F 9/30* (2018.01)
   *G06F 9/38* (2018.01)
(52) U.S. Cl.
   CPC .......... *G06F 15/80* (2013.01); *G06F 9/30145* (2013.01); *G06F 9/3802* (2013.01); *G06F 9/3867* (2013.01)
(58) Field of Classification Search
   None
   See application file for complete search history.

(56) References Cited

U.S. PATENT DOCUMENTS

| | | | | | |
|---|---|---|---|---|---|
| 4,270,170 A | * | 5/1981 | Reddaway | .......... | G06F 15/8023 712/11 |
| 5,280,474 A | * | 1/1994 | Nickolls | .......... | G06F 15/17393 714/802 |

(Continued)

FOREIGN PATENT DOCUMENTS

| | | | | |
|---|---|---|---|---|
| CN | 111626414 | | 9/2020 | |
| EP | 0539595 A1 | * | 5/1993 | ............... G06F 9/50 |

(Continued)

OTHER PUBLICATIONS

Machine Translation of Japanese Patent Application JP-2012150583-A, 2012. (Year: 2012).*

(Continued)

*Primary Examiner* — Steven G Snyder
(74) *Attorney, Agent, or Firm* — Hodgson Russ LLP

(57) ABSTRACT

A computing array includes a plurality of process element groups, and each of the plurality of the process element groups includes four process elements arranged in two rows and two columns and a merging unit. Each of the four process elements includes an input subunit; a fetch and decode subunit configured to obtain and compile the instruction to output a logic computing type; an operation subunit configured to obtain computing result data according to the logic computing type and the operation data; an output subunit configured to output the computing result data. The merging unit is connected to the output subunit of each of the four process elements, and configured to receive the computing result data output by the output subunit of each of the four process elements, merge the computing result data and output the merged computing result data.

18 Claims, 2 Drawing Sheets

(56) References Cited

U.S. PATENT DOCUMENTS

| | | | | |
|---|---|---|---|---|
| 5,598,408 A * | 1/1997 | Nickolls | ............ | G06F 15/17393 370/380 |
| 6,023,753 A * | 2/2000 | Pechanek | ............ | G06F 15/8023 712/18 |
| 6,067,609 A * | 5/2000 | Meeker | ............... | G06F 15/8023 712/15 |
| 6,167,502 A * | 12/2000 | Pechanek | ............ | G06F 15/8023 712/15 |
| 6,185,667 B1 * | 2/2001 | Abercrombie | ...... | G06F 15/8023 712/13 |
| 6,219,776 B1 * | 4/2001 | Pechanek | ............ | G06F 15/8007 712/E9.035 |
| 6,470,441 B1 * | 10/2002 | Pechanek | ............ | G06F 15/8023 712/15 |
| 6,606,699 B2 * | 8/2003 | Pechanek | ............ | G06F 9/30145 712/E9.035 |
| 6,769,056 B2 * | 7/2004 | Barry | ................. | G06F 15/8023 712/15 |
| 6,874,078 B2 * | 3/2005 | Pechanek | ............ | G06F 15/8007 712/213 |
| 11,106,268 B2 * | 8/2021 | Kallam | ............... | H03M 1/1205 |
| 11,200,186 B2 * | 12/2021 | Fleming, Jr. | ........ | G06F 13/4027 |
| 11,593,295 B2 * | 2/2023 | Fleming, Jr. | ........ | G06F 9/30145 |
| 11,640,196 B2 * | 5/2023 | Kallam | .................... | G06F 1/06 713/320 |
| 2003/0088754 A1 * | 5/2003 | Barry | ................. | G06F 15/8023 712/15 |
| 2004/0254965 A1 * | 12/2004 | Giernalczyk | ..... | G06F 15/17337 708/160 |
| 2010/0281236 A1 * | 11/2010 | Rakib | .................. | G06F 9/3891 712/228 |
| 2018/0173676 A1 * | 6/2018 | Tsai | ........................ | G06F 17/16 |
| 2022/0350598 A1 * | 11/2022 | Guan | .................... | G06F 9/3001 |

FOREIGN PATENT DOCUMENTS

| | | | | |
|---|---|---|---|---|
| WO | WO-9919807 A1 * | 4/1999 | ......... | G06F 15/8023 |
| WO | WO-9953411 A2 * | 10/1999 | ......... | G06F 15/8023 |
| WO | WO-9953439 A2 * | 10/1999 | ......... | G06F 9/30014 |
| WO | WO-0022535 A1 * | 4/2000 | ....... | G06F 15/17343 |
| WO | WO-0079394 A1 * | 12/2000 | ......... | G06F 15/8007 |
| WO | WO-0235856 A2 * | 5/2002 | ............. | G10L 19/00 |
| WO | WO-2009065072 A1 * | 5/2009 | ......... | G06F 9/30043 |
| WO | WO-2022012044 A1 * | 1/2022 | ........... | G06F 3/0643 |

OTHER PUBLICATIONS

Machine Translation of Japanese Patent Application JP-2013167945-A, 2013. (Year: 2013).*
'VLIW Microprocessors' by Tom Halfhill, Feb. 2000. (Year: 2000).*
'The Honeycomb Architecture: Prototype Analysis and Design' by Hoch, 1987. (Year: 1987).*
'The MasPar MP-1 Architecture' by Tom Blank, 1990. (Year: 1990).*
'Blitzen: A VLSI Array Processing Chip' by Robert A. (Fred) Heaton, Donald W. Blevins, 1989. (Year: 1989).*

* cited by examiner

COMPUTING ARRAY AND PROCESSOR HAVING THE SAME

CROSS-REFERENCE TO RELATED APPLICATIONS

This application is a continuation of International Application No. PCT/CN2021/092517, filed with the National Intellectual Property Administration of P. R. China on May 8, 2021, which claims priority to and benefits of Chinese Patent Application Serial No. 202011066367.5, filed with the National Intellectual Property Administration of P. R. China on Sep. 30, 2020, the entire content of which is incorporated herein by reference.

FIELD

The present disclosure relates to a field of reconfigurable computing architecture, and more particularly to a computing array and a processor having the same.

BACKGROUND

In a field of image and voice processing, neural network applications generally have 4*4 or more symmetrical computing arrays. Such computing arrays having a relative large input and output data bit width have a relative high flexibility, however, they cause a large power consumption and require a chip to have a large area.

SUMMARY

An object of the present disclosure is to provide a computing array and a processor.

According to a first aspect of the present disclosure, a computing array is provided. The computing array includes a plurality of process element groups arranged in two-dimensional rows and columns, and each of the plurality of the process element groups includes four process elements arranged in two rows and two columns. Each of the four process elements includes: an input subunit, configured to input an instruction and operation data; a fetch and decode subunit, configured to obtain and compile the instruction to output a logic computing type; an operation subunit, configured to obtain computing result data according to the logic computing type and the operation data; and an output subunit, configured to output the computing result data. Each of the plurality of the process element groups further includes a merging unit. The merging unit is connected to the output subunit of each of the four process elements, and configured to receive the computing result data output by the output subunit of each of the four process elements, merge the computing result data and output the merged computing result data.

In some embodiments of the present disclosure, the output subunit is configured to output the computing result data through a data line with a low bit width.

In some embodiments of the present disclosure, the merging unit is configured to output the merged computing result data through a data line with a high bit width.

In some embodiments of the present disclosure, the number of bits of the data line with the high bit width is n times that of the data line with the low bit width, where $n \geq 2$.

In some embodiments of the present disclosure, n is 2, 3, or 4.

In some embodiments of the present disclosure, when n is 2, the merging unit is configured to merge the computing result data output by the output subunits of any two process elements of the four process elements.

In some embodiments of the present disclosure, the merging unit is configured to take the computing result data from one of the any two process elements as high bit data, take the computing result data from the other of the any two process elements as low bit data, merge the high bit data and the low bit data, and output by the data line with the high bit width.

In some embodiments of the present disclosure, the computing array further includes a storage unit. The storage unit is configured to store the merged computing result data output by the merging unit.

In some embodiments of the present disclosure, the computing array further includes a load unit. The load unit is connected to the input subunits of two of the four process elements to input the instruction and the operation data.

In some embodiments of the present disclosure, each process element is connected to an adjacent process element.

In some embodiments of the present disclosure, each merging unit is connected to an adjacent merging unit.

According to a second aspect of the present disclosure, a processor is provided, including the computing array as described in the first aspect.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
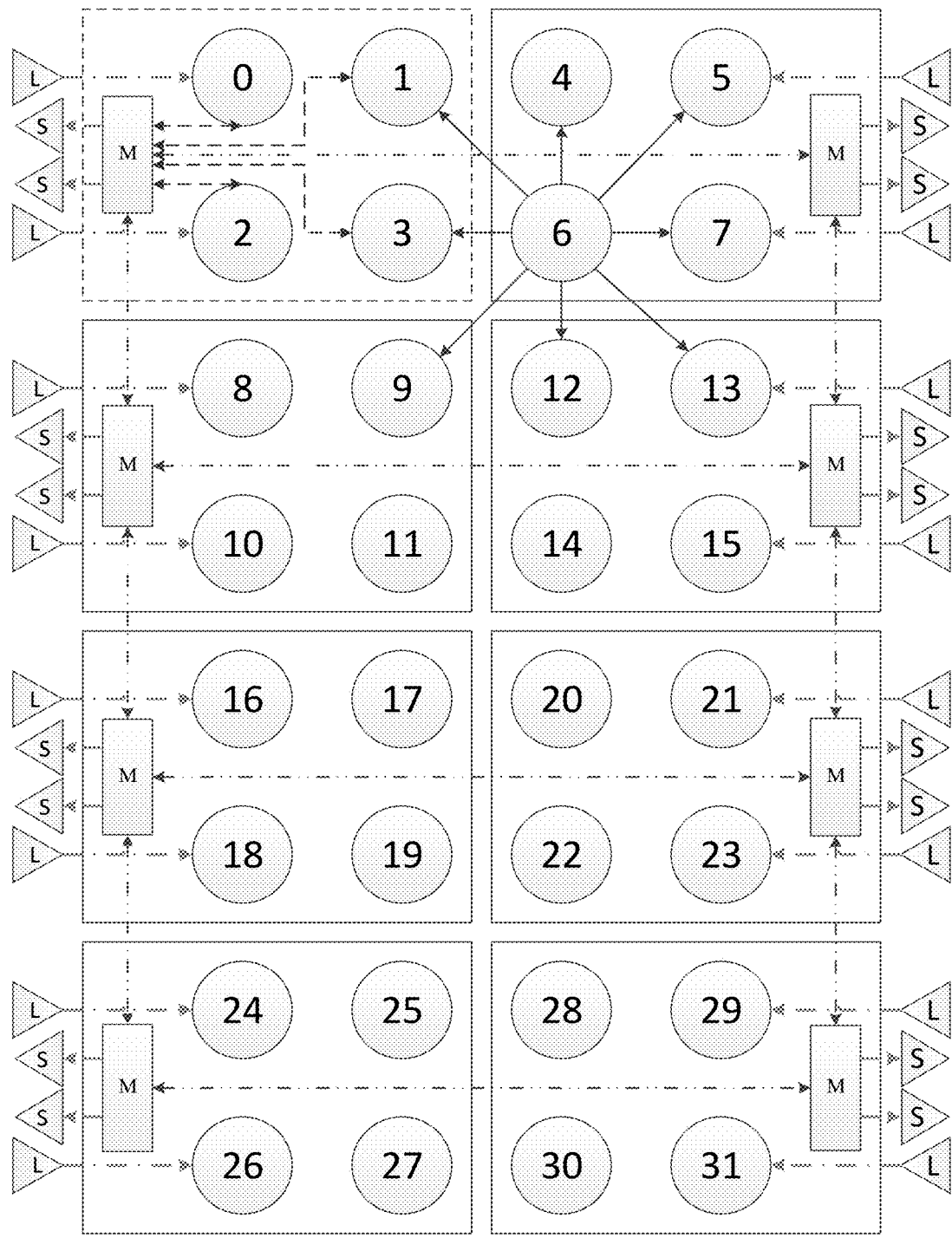
FIG. 1 is a schematic diagram showing a computing array according to an embodiment of the present disclosure.

Embodiments of the present disclosure are described in detail below, examples of which are illustrated in the drawings. The same or similar units are denoted by same reference numerals in different drawings unless indicated otherwise. The embodiments described herein with reference to drawings are explanatory, and used to generally understand the present disclosure. The embodiments shall not be construed to limit the present disclosure.

An object of the present disclosure is to provide a computing array and a processor, which are capable of improving a flexibility of a configuration thereof and controlling a power consumption and a size (for example, an area) of a chip.

In some embodiments of the present disclosure, a computing array includes a plurality of process element groups arranged in two-dimensional rows and columns. Each of the plurality of the process element groups includes four process elements arranged in two rows and two columns. Each of the four process elements includes an input subunit, configured to input an instruction and operation data; a fetch and decode subunit, configured to obtain and compile the instruction to output a logic computing type; an operation subunit, configured to obtain computing result data according to the logic computing type and the operation data; and an output subunit, configured to output the computing result data. Each of the plurality of the process element groups further includes a merging unit. The merging unit is connected to the output subunit of each of the four process elements, and configured to receive the computing result data output by the output subunit of each of the four process elements, merge the computing result data and output the merged computing result data.

In some embodiments of the present disclosure, the output subunit may be configured to output the computing result data through a data line with a low bit width.

In some embodiments of the present disclosure, the merging unit may be configured to output the merged computing result data through a data line with a high bit width.

In some embodiments of the present disclosure, the number of bits of the data line with the high bit width may be n times that of the data line with the low bit width, where n≥2.

In some embodiments of the present disclosure, n may be 2, 3, or 4.

In some embodiments of the present disclosure, when n is 2, the merging unit may be configured to merge the computing result data output by the output subunits of any two process elements of the four process elements.

In some embodiments of the present disclosure, the merging unit may be configured to take the computing result data from one of the any two process elements as high bit data, take the computing result data from the other of the any two process elements as low bit data, merge the high bit data and the low bit data, and output by the data line with the high bit width.

In some embodiments of the present disclosure, the computing array further includes a storage unit. The storage unit is configured to store the merged computing result data output by the merging unit.

In some embodiments of the present disclosure, the computing array further includes a load unit. The load unit is connected to the input subunits of two of the four process elements to input the instruction and the operation data.

In some embodiments of the present disclosure, each process element is connected to an adjacent process element.

In some embodiments of the present disclosure, each merging unit is connected to an adjacent merging unit.

FIG. 1 shows a computing array according to an embodiment of the present disclosure. The computing array may include a plurality of process element groups arranged in two-dimensional rows and columns. Each process element group may include four process elements arranged in two rows and two columns.

In some embodiments of the present disclosure, the computing array may be used for a coarse-grained reconfigurable processor.

Figure 2:
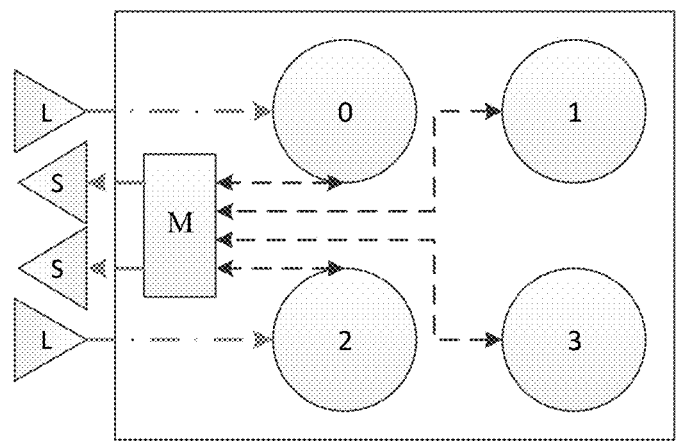
FIG. 2 is a schematic diagram showing a process element group according to an embodiment of the present disclosure.

As shown in FIG. 2, each process element group includes four process elements, and the four process elements are arranged in two rows and two columns. The computing array in FIG. 2 includes 32 process elements, such as process elements 0 to 31. Among them, one process element group may include four process elements, such as process element 0, process element 1, process element 2 and process element 3.

Figure 3:
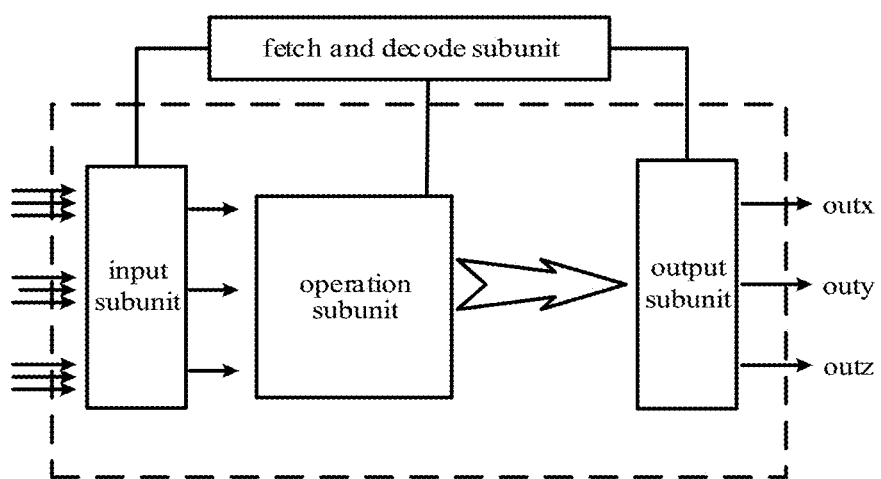
FIG. 3 is a schematic diagram showing a process element in a process element group according to an embodiment of the present disclosure.

In some embodiments of the present disclosure, each of the four process elements includes an input subunit, a fetch and decode subunit, an operation subunit and an output subunit as shown in FIG. 3.

The fetch and decode subunit is configured to obtain and compile an instruction to output a logic computing type.

The operation subunit is connected to the fetch and decode subunit to obtain the logic computing type from the fetch and decode subunit. The operation subunit may be configured to obtain and output computing result data according to the logic computing type and the operation data.

The input subunit and the output subunit are separately connected to the fetch and decode subunit and the operation subunit. The input subunit may be configured to input the instruction and the operation data in multiple encoding ways. The output subunit may be configured to output the computing result data in multiple encoding ways. The output subunit may be configured to output the computing result data by a data line with a low bit width.

The process element groups may further include a merging unit. The merging unit is connected to the output subunit of the process element of the process element groups by a preset data line with a low bit width. An output of the merging unit is connected to a data line with a high bit width. The number of bits of the data line with the high bit width may be several times that of the data line with the low bit width.

The merging unit may be configured to merge low bit width input data of a plurality of the process elements of the process element group into high bit width output data. The merging unit may be configured to output the high bit width output data by the data line with the high bit width.

In some embodiments of the present disclosure, the low bit width input data indicates computing result data, and the high bit width output data indicates the merged computing result data.

In some embodiments of the present disclosure, the number of bits of the data line with the high bit width is 2 times that of the data line with the low bit width. In this case, the merging unit may be configured to merge the low bit width input data of any two process elements of the process element group into the high bit output data. The merging unit may be configured to output the high bit width output data by the data line with the high bit width.

The computing array further includes a load unit. The load unit is connected to the process element, and configured to input driving data to process element. If the driving data is received by the process element, computing is started.

The computing array further includes a storage unit. The storage unit is connected to the process element, and configured to store the output data output by the process element.

The load unit is used as a real starting point for the computing, and configured to provide data to the PE actively. Once the data is loaded into the PE from the load unit, the PE starts the computing. After the PE receives the data, completes the computing, and outputs the result, the storage unit stores the result.

In FIG. 1, circles marked with numbers represent process elements (PEs), and triangles marked with L represent load units. The load unit L is configured to load data from a memory to the process element, that is, the load unit L provides the PE with data for operation. Moreover, triangles marked with S represent storage units, and the storage unit S is configured to store data generated by the PE to the memory, that is, the storage unit S writes back the result data.

In FIG. 1, there are 8 process element groups, and each process element group includes four process elements and one merging unit (M). Every four process elements correspond to one merging unit (M), that is, PE0, PE1, PE2 and PE3 correspond to one merging unit (M), and PE4, PE5, PE6 and PE7 correspond to one other merging unit (M), and so on. The merging unit (M) is connected to the storage unit S. The merging units (M) are connected to each other by the data line with the high bit width to transmit the high bit width data.

The merging unit (M) may be configured to merge the low bit width input data of any two process elements of the process element groups into the high bit width output data according to a sequence of the high bit and the low bit. The high bit width output data includes a set of high bit width data and a set of low bit width data, and the high bit width data is from one of the two process elements of the process element group, and the low bit data is from the other one of the two process elements of the process element group.

The number of the bits of the low bit width input data may be 8, 16 or 32, and the number of the bits of the high bit width input data may be 16, 32 or 64.

For example, when the bit width of the input data is 16 bits and the bit width of the output data is 32 bits, two storage units (i.e., units S shown in the drawings) may output high bit data of 16 bits and low bit data of 16 bits, respectively. The merging units (M) may directly transmit 32 bits data to another, that is, the PEs with a bit width of 16 bits may be merged into a PE with a bit width of 32 bits.

The computing array may include 8 process element groups. The 8 process element groups are arranged in two columns and four rows. Each column includes 4 process element groups, and each row includes 2 process element groups. The merging units included in the process element groups in the same column are sequentially interconnected to each other, and the merging units included in the two process element groups in the same row are interconnected to each other.

In an embodiment, a process element in one of the 8 process element groups may be connected to a process element in an adjacent process element group.

According to the embodiments of the present disclosure, various operation functions may generally obtain a final result directly through the PE array without repeatedly inputting to and outputting from the PEs, and each PE may be directly connected to the load unit or the storage unit.

If performing 1024-point FIR, for a serial configuration, only two load units L are used to input data to the PE. However, many PEs are required in this case. For example, at most 16 PEs are required to perform a serial operation. Data enters the PE0 as a start, 16 PEs on the left are used to ensure that operation result data is obtained within these PEs. If necessary, the 16 PEs on a right side may perform other operations in parallel.

If performing a softmax function, some intermediate results may be obtained with only a few PEs. At this time, the result obtained by any PE may be directly output without crossover of other PEs.

In other words, for short-path computing functions, data flow may flow in a horizontal direction, and for long-path computing functions, the data flow may flow in a vertical direction. The flow direction may be selected by those skilled in the art according to actual needs, such as in the horizontal or vertical direction. In a field of image or other fields that require a large amount of operations, the PE array may also be expanded to three dimensions.

Each PE may be connected to 8 PEs around this PE, for example they are connected to form a union-jack shape, and each PE may an output result directly or by crossing one PE. All PEs are connected in the same way. Moreover, every 4 PEs are provided with the corresponding load unit (represented by the triangles marked with L in FIG. 1) and the corresponding storage units (represented by the triangles marked with S in FIG. 1), forming a relatively independent process element group to allow multiple functions to be computed in parallel.

A solid black line with an arrow represents a basic connection between PEs. A two-dot chain line with an arrow represents a basic connection between the merging units. A dot chain line with an arrow represents a basic connection between the process element PE and the load unit L or the storage unit S.

In the present disclosure, a dashed line represents a basic connection between the merging unit and the PE, such as PE0, PE1, PE2, or PE3. The merging unit is used to adjust the bit width.

For example, an operation bit width of 32 bits is used for the PE, the PE may be compatible with input data of 32 bits and below. In a field of image, input data with a bit width of 8 bits is generally used, 32 bits of the PE may be divided into two 16 bits (i.e., high_16 bit and low_16 bit), and the merging unit may arrange the two sets of the input data with the bit width of 8 bits to low_8 bits of high_16 and low_8 bits of low_16, respectively, to obtain two sets of 8 bits width processing results simultaneously.

For another example, an operation bit width of 16 bits is used for the PE. When a 48-bit or 64-bit multiplication result is required, the merging unit may process the operation results of the 4 PEs in one process element group, thereby obtaining a 64-bit width processing result after multiplicities of the 4 PEs are completed.

At the same time, through the interconnection between the merging units, intermediate results of the high bit width or the low bit width may be transmitted between the PEs. For example, after the intermediate result of the high bit width is transmitted and divided, it enters into a lower PE for processing/computing.

The present disclosure has the following technology effect.

By arranging different numbers of the process elements in the horizontal and vertical directions, the computing array may achieve an optimized configuration in short-path and long-path computing.

By providing the merging unit in the process element group, the computing array may be applied to computing scenarios with high precision and large bit width.

Further, by providing the load unit L and the storage unit S, multiple functions may be processed in parallel.

In addition, a processor is provided. The processor includes the above-mentioned computing array.

In some embodiments of the present disclosure, the computing array includes a plurality of process element groups arranged in two-dimensional rows and columns. Each of the plurality of the process element groups includes four process elements arranged in two rows and two columns. Each of the four process elements includes an input subunit, configured to input an instruction and operation data; a fetch and decode subunit, configured to obtain and compile the instruction to output a logic computing type; an operation subunit, configured to obtain computing result data according to the logic computing type and the operation data; and an output subunit, configured to output the computing result data.

In some embodiments of the present disclosure, each of the plurality of the process element groups further includes a merging unit. The merging unit is connected to the output subunit of each of the four process elements, and configured to receive the computing result data output by the output subunit of each of the four process elements, merge the computing result data and output the merged computing result data.

In some embodiments of the present disclosure, the output subunit may be configured to output the computing result data through a data line with a low bit width.

In some embodiments of the present disclosure, the merging unit may be configured to output the merged computing result data through a data line with a high bit width.

In some embodiments of the present disclosure, the number of bits of the data line with the high bit width may be n times that of the data line with the low bit width, where n≥2.

In some embodiments of the present disclosure, n may be 2, 3, or 4.

In some embodiments of the present disclosure, when n is 2, the merging unit may be configured to merge the computing result data output by the output subunits of any two process elements of the four process elements.

In some embodiments of the present disclosure, the merging unit may be configured to take the computing result data from one of the any two process elements as high bit data, take the computing result data from the other of the any two process elements as low bit data, merge the high bit data and the low bit data, and output by the data line with the high bit width.

In some embodiments of the present disclosure, the computing array further includes a storage unit. The storage unit is configured to store the merged computing result data output by the merging unit.

In some embodiments of the present disclosure, the computing array further includes a load unit. The load unit is connected to the input subunits of two of the four process elements to input the instruction and the operation data.

In some embodiments of the present disclosure, each process element is connected to an adjacent process element.

In some embodiments of the present disclosure, each merging unit is connected to an adjacent merging unit.

According to the embodiment of the present disclosure, by arranging different numbers of process elements in the horizontal and vertical directions, the computing array may achieve an optimized configuration in short-path and long-path computing. By providing the merging unit in the process element group, the computing array may be applied to the computing scenarios with a high precision and a large bit width. In addition, with the computing array and the processor of the embodiments of the present disclosure, the flexibility of configuration is improved, and a size (for example, an area) and a power consumption of a chip are controllable.

In the present disclosure, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, like two or three, unless specified otherwise.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, modifications, alternatives and variations can be made in the embodiments without departing from scope of the present disclosure.

What is claimed is:

1. A computing array, comprising:
a plurality of process element groups arranged in two-dimensional rows and columns, each of the plurality of process element groups comprising:
four process elements arranged in two rows and two columns, each of the four process elements comprising:
an input subunit, configured to input an instruction and operation data;
a fetch and decode subunit, configured to obtain and compile the instruction to output a logic computing type;
an operation subunit, configured to obtain computing result data according to the logic computing type and the operation data; and
an output subunit, configured to output the computing result data; and
a merging unit, connected to the output subunit of each of the four process elements, and configured to receive the computing result data output by the output subunit of each of the four process elements, merge the computing result data and output the merged computing result data;
wherein one process element is connected to a first adjacent process element of a same process element group and a second adjacent process element of other process element group, wherein the one process element is directly connected to the first adjacent process element in one of a row, column and diagonal direction, and the one process element is directly connected to the second adjacent process element in one of a row, column and diagonal direction, and
wherein the merging unit is further configured to arrange a plurality of sets of input data to different positions in a bit width of the process element, wherein a sum of bit widths of the plurality of sets of input data is less than or equal to the bit width of the process element.

2. The computing array according to claim 1, wherein the output subunit is configured to output the computing result data through a data line with a low bit width.

3. The computing array according to claim 2, wherein the merging unit is configured to output the merged computing result data through a data line with a high bit width.

4. The computing array according to claim 3, wherein a number of bits of the data line with the high bit width is n times that of the data line with the low bit width, where n≥2.

5. The computing array according to claim 4, wherein n is 2, 3, or 4.

6. The computing array according to claim 5, wherein when n is 2, the merging unit is configured to merge the computing result data output by the output subunits of any two process elements of the four process elements.

7. The computing array according to claim 6, wherein the merging unit is configured to take the computing result data from one of the any two process elements as high bit data, take the computing result data from the other of the any two process elements as low bit data, merge the high bit data and the low bit data, and output by the data line with the high bit width.

8. The computing array according to claim 1, further comprising:
a storage unit, configured to store the merged computing result data output by the merging unit.

9. The computing array according to claim 1, further comprising:
a load unit connected to the input subunits of two of the four process elements to input the instruction and the operation data.

10. The computing array according to claim 1, wherein each merging unit is connected to an adjacent merging unit.

11. A processor, comprising a computing array, the computing array comprising:
a plurality of process element groups arranged in two-dimensional rows and columns, each of the plurality of process element groups comprising:
four process elements arranged in two rows and two columns, each of the four process elements comprising:
an input subunit, configured to input an instruction and operation data;
a fetch and decode subunit, configured to obtain and compile the instruction to output a logic computing type;
an operation subunit, configured to obtain computing result data according to the logic computing type and the operation data; and
an output subunit, configured to output the computing result data; and
a merging unit, connected to the output subunit of each of the four process elements, and configured to receive the computing result data output by the output subunit of each of the four process elements, merge the computing result data and output the merged computing result data;
wherein one process element is connected to a first adjacent process element of a same process element group and a second adjacent process element of other process element group, wherein the one process element is directly connected to the first adjacent process element in one of a row, column and diagonal direction, and the one process element is directly connected to the second adjacent process element in one of a row, column and diagonal direction, and
wherein the merging unit is further configured to arrange a plurality of sets of input data to different positions in a bit width of the process element, wherein a sum of bit widths of the plurality of sets of input data is less than or equal to the bit width of the process element.

12. The processor according to claim 11, wherein the output subunit is configured to output the computing result data through a data line with a low bit width.

13. The processor according to claim 12, wherein the merging unit is configured to output the merged computing result data through a data line with a high bit width.

14. The processor according to claim 13, wherein a number of bits of the data line with the high bit width is n times that of the data line with the low bit width, where n≥2.

15. The processor according to claim 14, wherein when n is 2, the merging unit is configured to merge the computing result data output by the output subunits of any two process elements of the four process elements.

16. The processor according to claim 15, wherein the merging unit is configured to take the computing result data from one of the any two process elements as high bit data, take the computing result data from the other of the any two process elements as low bit data, merge the high bit data and the low bit data, and output by the data line with the high bit width.

17. The processor according to claim 11, further comprising:
a storage unit, configured to store the merged computing result data output by the merging unit.

18. The processor according to claim 11, further comprising:
a load unit connected to the input subunits of two of the four process elements to input the instruction and the operation data.

* * * * *